United States Patent Office 3,159,434
Patented Dec. 1, 1964

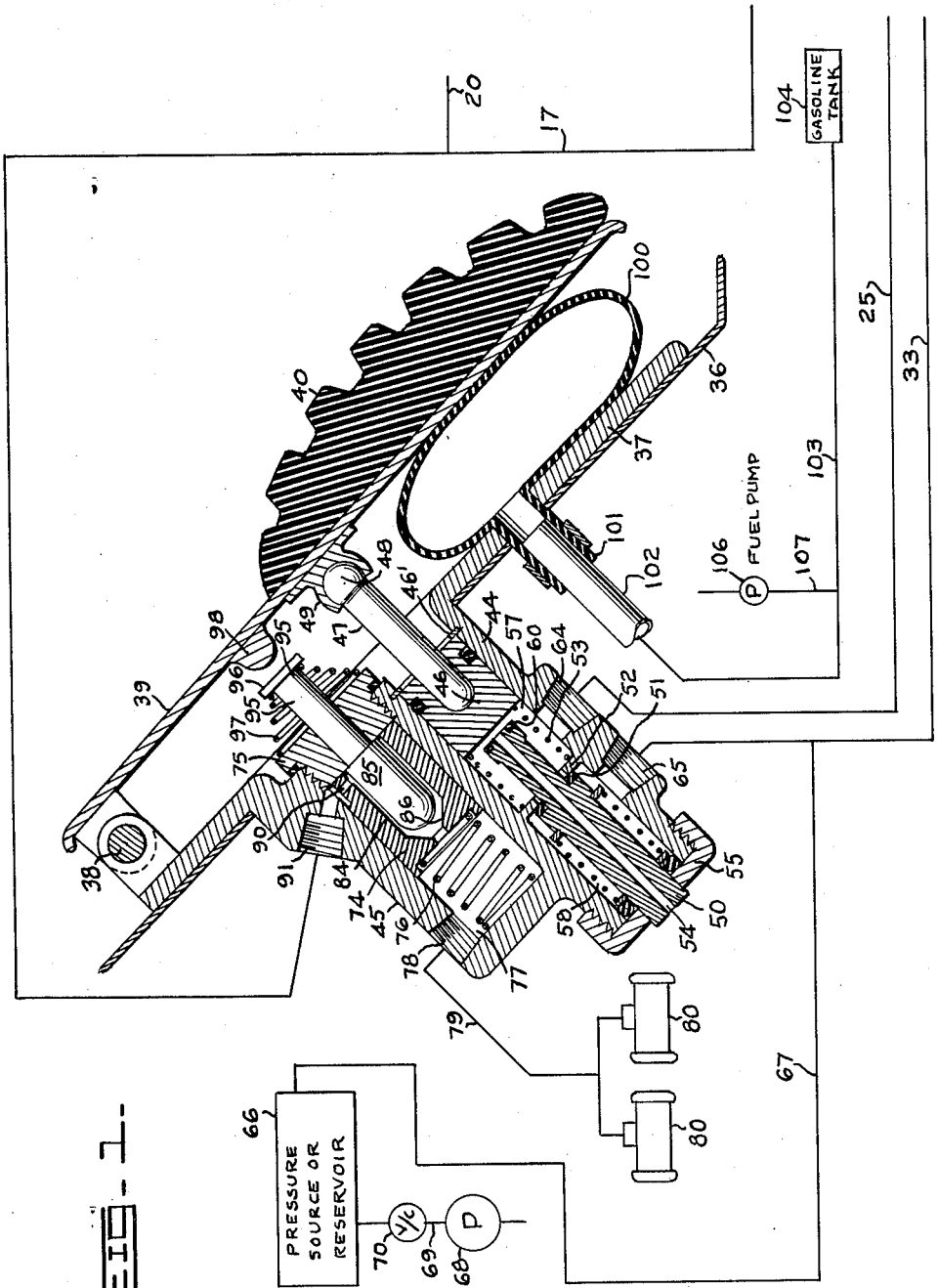

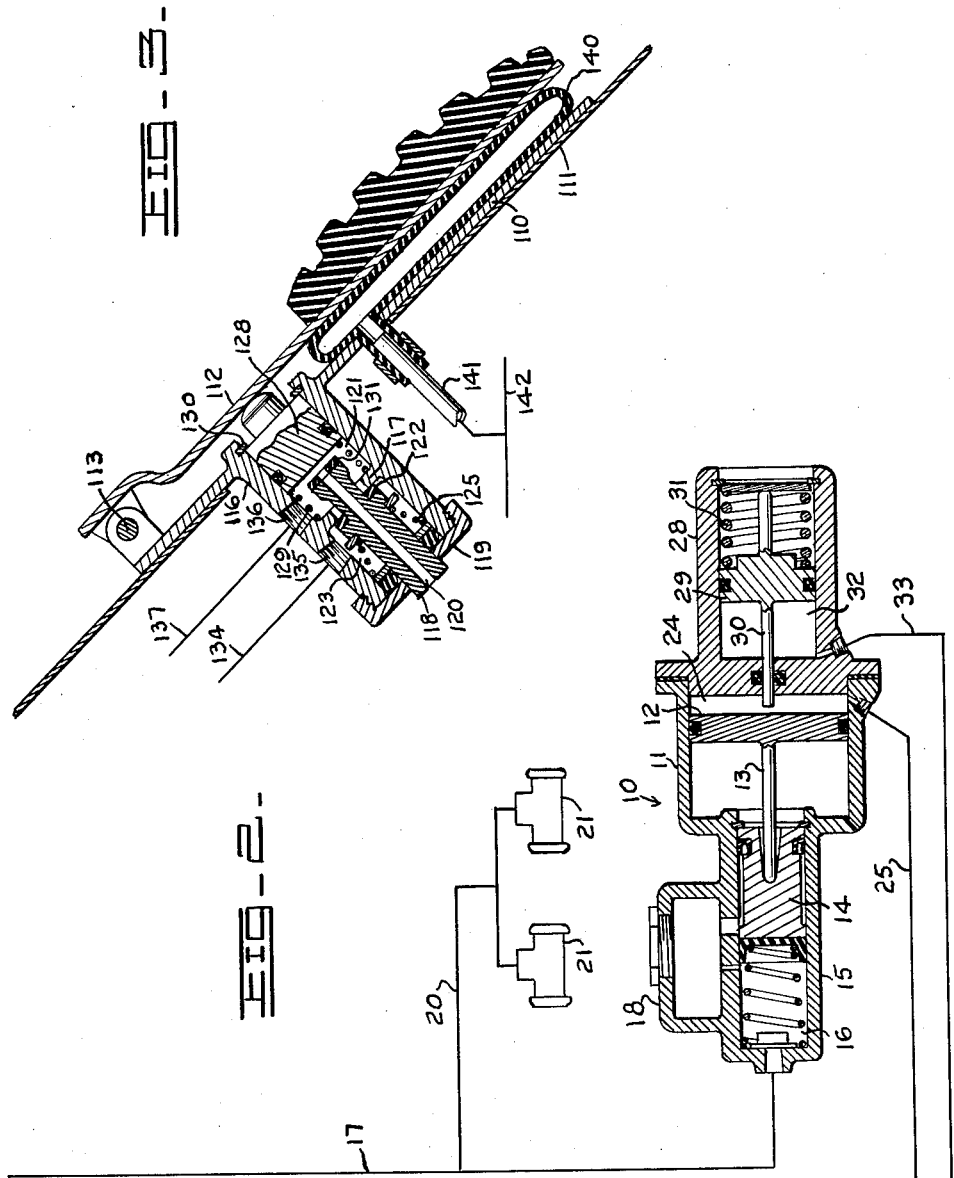

3,159,434
POWER BRAKE SYSTEM
William Stelzer, Bloomfield Hills, Mich., assignor to Kelsey-Hayes Company, Detroit, Mich., a corporation of Delaware
Filed Apr. 5, 1961, Ser. No. 100,957
14 Claims. (Cl. 303—24)

This invention relates to a power brake system and more particularly to such a system wherein the rate of vehicle deceleration is utilized for increasing pedal reaction.

It is well known that vehicle brakes are more effective at low speeds that at higher speeds and since, with present systems, the brake pedal reaction is in proportion to the applying force, drivers often have the unpleasant experience of overbraking when applying the brakes with normal force at low speeds.

An important object of the present invention is to utilize in a novel manner the rate of vehicle deceleration for increasing reaction to the brake pedal to tend to prevent overbraking under the conditions stated.

A further object is to provide such a system wherein the surge of fluid in the fuel line (or any other fluid line), is utilized for increasing brake pedal reaction.

A further object is to provide a brake system wherein reaction transmitted to the pedal is partly responsive to the rate of vehicle deceleration and partly to the brake applying force, thereby preventing overbraking when a light brake application is intended.

A further object is to provide a system of this character having other features of novelty, residing mainly in an emergency brake system which becomes effective when the power fails.

Other objects and advantages of the invention will become apparent during the course of the following description.

In the drawings I have shown two embodiments of the invention. In this showing:

FIGURE 1 is a sectional view through a brake pedal and the mechanism associated therewith, parts of the system being diagrammatically represented;

FIGURE 2 is a sectional view of the brake applying motor and master cylinder and associated elements, parts of the system being diagrammatically represented, FIGURE 2 forming in effect a continuation of the showing in FIGURE 1; and FIGURE 3 is a sectional view of a brake pedal and associated mechanisms showing a modified form of the system.

Referring to FIGURE 2, the numeral 10 designates a combined motor and master cylinder unit having a motor cylinder 11 in which is arranged a piston 12. A push rod 13, carried by the piston, engages the plunger 14 of a master cylinder 15 to displace fluid from a chamber 16 into a hydraulic line 17. A conventional reservoir 18 serves to replenish fluid in the master cylinder. The line 17 supplies fluid to the wheel cylinders of the vehicle and in FIGURE 2 a branch line 20 is shown as being connected to the line 17 for supplying hydraulic fluid to the rear wheel cylinders 21.

The present system is illustrated as being operative with super-atmospheric pressure, and such pressure is supplied to the working chamber 24 of the motor through a line 25, the means for supplying such pressure to the line 25 being described below.

At the end of the motor cylinder 11 opposite the master cylinder is arranged a coaxial cylinder 28 in which is arranged a piston 29 provided with an axial push rod 30 normally spaced from the piston 12 as shown. A strong spring 31 biases the piston 29 to the left to tend to engage the push rod 30 with the piston 12. The chamber 32 to the left of the piston 29 is in fixed communication with the source of operating pressure through a line 33, as will become more apparent below.

The piston 29 and associated elements constitute a safety feature of the system, and so long as pressure is present in the source to be referred to, the piston 29 is maintained inoperative by pressure in the chamber 32.

The remaining parts of the system are shown in FIGURE 1. The numeral 36 designates the toe board of the vehicle against which is secured a preferably cast plate 37 at the upper end of which is pivoted, as at 38, a brake pedal 39 having a rubber or similar pedal pad 40.

Preferably cast integral with the plate 37 in the present embodiment of the invention is a pair of cylinders 44 and 45 in the former of which is arranged a plunger 46 engaged by a push rod 47 having universal connection with the brake pedal through a spherical head 48 arranged in a socket 49 carried by the pedal 39.

Within the cylinder 44 is arranged an internal annular valve seat 52 and a spring 53 is arranged between this seat and the plunger 46 to bias the latter to its normal off position as shown in FIGURE 1 in engagement with a snap ring 46'.

An axially movable tubular member 50 is arranged in the cylinder 44 and carries a rubber or similar valve 51 normally engaging the seat 52. The member 50 has an axial passage 54 therethrough in fixed communication with the atmosphere, the lower end of the member 50 being slidable through a cap 55 on the lower end of the cylinder 44.

The spring 53 is arranged in a chamber 57 with which the upper end of the axial passage 54 normally communicates and this chamber is normally disconnected from a lower chamber 58 when the valve element 51 is closed. This element is opened by movement of the plunger 46, upon operation of the brake pedal, to engage the upper end of the member 50. This member is provided with a small annular resilient valve 60 and engagement of the plunger 46 with such valve element closes the chamber 57 to the atmosphere.

The chamber 57 is in fixed communication with the line 25, previously described, through a port 64. The chamber 58 is in fixed communication through a port 65 with the line 33 and this line is supplied with fluid pressure from a pressure source or reservoir 66 through a line 67. The reservoir 66 is supplied with super-atmospheric pressure from a pump or compressor 68 through a line 69 in which is arranged a check valve 70.

The cylinder 45 is provided therein with a plunger 74 biased upwardly to its limit of movement in engagement with a nut 75 by a spring 76 arranged in a chamber 77 formed beneath the plunger 74. This chamber communicates through a port 78 with a line 79 leading to the front wheel cylinders 80.

The plunger 74 is provided with a bore 84 in which is arranged a valve element 85 of smaller diameter than the bore to provide a passage therearound. The lower end of the valve 85 is hemispherical and is movable under conditions to be described into engagement with a valve seat 86 to cut off communication between the bore 84 and the chamber 77.

The plunger 74 is provided wih a port 90 in constant communication with a port 91 in the cylinder 45 and the latter port is connected to the line 17. It will therefore be apparent that upon operation of the master cylinder plunger 14 (FIGURE 2) hydraulic fluid will be supplied through lines 17 and 20 to the rear wheel cylinders 21 and to the front wheel cylinders 80 through line 17, ports 91 and 90, bore 84, chamber 77 and line 79.

The valve 85 is provided with an axial stem 95 slidable in the nut 75. The stem 95 is headed as at 96 and is biased to its normal position shown in FIGURE 1 by a spring 97. A substantially hemispherical boss 98 is carried by the pedal 39 and is engageable upon movement of the pedal beyond its normal limit of movement, as will become apparent below, to operate the stem 95 and close the valve 85 and effect movement of the plunger 74.

A rubber or similar expansible bladder 100 is arranged between the plate 37 and pedal 39 and has an integral extension 101 connected to a pipe 102 communicating with the liquid fuel line 103 supplied with fuel from a tank 104. A fuel pump 106 supplies fuel through a line 107 to the vehicle carburetor. The pipe 102 is connected to the longitudinally extending fuel line 103 adjacent the forward end thereof and the present invention takes advantage of the fact that the long fuel line 103 provides an appreciable forward surging of the fuel during vehicle deceleration. This fluid surge is utilized to increase pressure in the bladder 100.

The form of the invention previously described is a complete braking system including emergency brake operating means. In FIGURE 3 there is shown a simplified type of mechanism for increasing pedal reaction incident to the surging of fuel in the fuel line. In the modified form of the invention, a plate 110 is carried by the toe board 111 and a brake pedal 112 is pivoted to the plate 110 as at 113.

An integral cylinder 116 is carried by the plate 110 and such cylinder is provided therein with an internal annular valve seat 117 similar in structure and function to the valve seat 52. An axial valve member 118 has its lower end slidable through a cap 119 threaded on the cylinder 116. The member 118 is provided with an axial passage 120 one end of which communicates with the atmosphere and the other end of which communicates with the chamber 121 to normally maintain atmospheric pressure therein. A rubber or similar valve element 122, carried by the valve member 118, normally engages the seat 117 to disconnect the chamber 121 from a lower chamber 123. A spring 125 in the chamber 123 biases the valve element 122 to closed position.

A plunger 128 is slidable in the cylinder 116 and has its upper end engaging the brake pedal 112. A spring 129 biases the plunger 128 to its uppermost position in engagement with a snap ring 130, the plunger 128 thus being normally out of engagement with a valve element 131 carried by the upper end of the valve member 118. The structure in FIGURE 3 is primarily intended to be used with a conventional air brake system. Accordingly superatmospheric pressure is supplied to the chamber 123 from a line 134 through a port 135, while brake applying pressure, when the device is operative, is supplied through a port 136 to a line 137.

Beneath the free end of the brake pedal is arranged a rubber or similar bladder 140 communicating through a line 141 with the fuel line 142 of the vehicle, this line and associated elements being comparable to the means shown in FIGURE 1 for utilizing liquid fuel surges for increasing pressure in the bladder 140.

*Operation*

The operation of the form of the system shown in FIGURES 1 and 2 is as follows. The parts normally occupy the positions shown in the drawings, atmospheric pressure being present in the chamber 57 and hence in the line 25 and motor chamber 24. Assuming that there is pressure present in the reservoir 66, such pressure will be supplied to the chamber 58 and through the line 33 to the chamber 32 (FIGURE 2) to maintain the piston plunger 29 inoperative. It will be clear that the plunger 29 is inoperative whenever pressure is present in the source.

When the device is to be operated, the operator will depress the brake pedal 39, whereupon the push rod 47 moves the plunger 46 into engagement with the valve element 60 to disconnect the chamber 57 from the atmospheric passage 54. Slight further movement of the pedal will "crack" the valve 51, thus admitting pressure from the chamber 58 to the chamber 57, thence through line 25 to the motor chamber 24 (FIGURE 2) to operate the piston 12 and thus move the master cylinder plunger 14. Hydraulic fluid will flow from the chamber 16 through the lines 17 and 20 to the rear wheel cylinders 21. Pressure fluid in the line 17 (FIGURE 1) also flows into the bore 84 and thus into the chamber 77 and through line 79 to the front wheel cylinders 80. Accordingly, all of the vehicle brakes will be applied by power. It will be apparent that pressure in the chamber 57 will act against the lower face of the plunger 46 to provide the brake pedal with reaction which will be proportional to the pressure in the chamber 57 and consequently proportional to the degree of brake application.

As previously stated, there is a tendency for drivers to overbrake at lower vehicle speeds. With the present system, a given rate of vehicle deceleration will cause a forward surge of fluid through the vehicle line 103 and into the bladder 100, thus increasing the degree of pedal reaction for a given brake application. This eliminates any tendency for the operator to overbrake at lower vehicle speeds. The degree of distribution of the reaction between the plunger 46 and bladder 100 may be varied to suit the particular construction or system in which the invention is embodied, as will be apparent.

When the brake pedal is released, the spring 53 promptly returns the plunger 46 to its normal inoperative position, opening the chamber 57 to the atmosphere and thus releasing pressure in the line 25 and motor chamber 24. The conventional master cylinder return spring will then return the plunger 14 and piston 12 to their normal positions.

Since very little movement of the brake pedal in a system of this character is required for the application of the brakes, normal full application will take place without contact between the boss 98 and stem head 96. Accordingly, during such normal brake applications the valve 85 will remain open.

Assuming that there is a failure in the source of brake operating pressure or any of the lines connected thereto, the pressure in the chamber 32 (FIGURE 2) will drop to atmospheric pressure. The relatively heavy spring 31 thereupon moves the plunger 29 to the left in FIGURE 2 to engage the stem 30 with the piston 12. This piston will then be moved to operate the master cylinder plunger 14 to apply the brakes.

Under the conditions stated, the reaction on the brake pedal will be practically nil. However, further depression of the brake pedal engages the boss 98 with the head 96 to move the valve 85 to closed position and then transmit movement to the plunger 74. The valve 85 being closed, no hydraulic brake fluid will flow from the line 17 to the chamber 77 and the plunger 29 (FIGURE 2) functions to apply only the rear brakes. However, movement of the plunger 74, after the valve 85 is closed, displaces fluid from the chamber 77 through line 79. This operation applies the front brakes and also provides the brake pedal with "feel" or reaction.

From the foregoing it will be apparent that the mechanism is highly advantageous for providing supplemental brake pedal reaction under normal operating conditions to prevent overbraking. Also the system provides safety features for applying the brakes and for providing the brake pedal with reaction in the event of a failure of power in the source.

In the mechanism shown in FIGURE 3, the safety feature is not included. However, the bladder 140 is expansible due to surging in the gas line 142 upon a predetermined rate of vehicle deceleration to add reaction to the brake pedal and thus prevent overbraking. The functioning of the valve mechanism in FIGURE 3 is the same as the functioning of the elements within the cylinder 44 in FIGURE 1. Depression of the brake pedal first engages the plunger 128 with the valve 131 to close the chamber 121 to the atmosphere and then open the valve element 122 to supply pressure from the chamber 123 to the chamber 121 and thus to the operating line 137. Under such operating conditions, part of the pedal reaction will be provided by pressure acting against the bottom of the plunger 128 and part of the reaction will be supplied by the expansion of the bladder 140 to assist in eliminating overbraking of the vehicle.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. In a power operated braking system for a vehicle having valve means to control the power and means operated by manual force to control said valve means, in combination, a body of liquid longitudinally disposed in relation to the vehicle, means to contain said liquid, and means to transmit the pressure produced by said body of liquid due to deceleration of the vehicle to react on said means operated by manual force to oppose said manual force.

2. A motor vehicle brake system comprising a manually operable member, mechanism connected for operation by said manually operable member for applying the vehicle brakes, a confined body of liquid elongated longitudinally of the vehicle, and means for transmitting to said manually operable member to oppose operation thereof forward surging of said body of liquid incident to vehicle deceleration.

3. A motor vehicle brake system comprising a manually operable member, mechanism connected for operation by said manually operable member for applying the vehicle brakes, said mechanism including means for reacting against said manually operable member to a degree proportional to brake operation, a liquid container elongated longitudinally of the vehicle, and means for utilizing the forward surging of the liquid in said container incident to vehicle deceleration for increasing the reaction against said manually operable member.

4. A motor vehicle brake system comprising a manually operable member, mechanism connected for operation by said manually operable member for applying the vehicle brakes, said mechanism including means for reacting against said manually operable member to a degree proportional to brake operation, an expansible bladder engaging said manually operable member and filled with liquid, a confined body of liquid, and a duct connecting said body of liquid to said bladder whereby the inertia of said body of liquid occurring incident to vehicle deceleration will displace fluid into said bladder to expand the latter and increase the reaction against said manually operable member.

5. A motor vehicle brake system comprising a manually operable member, mechanism connected for operation by said manually operable member for applying the vehicle brakes, said mechanism including means for reacting against said manually operable member to a degree proportional to brake operation, an expansible bladder engaging said manually operable member and filled with liquid, and a liquid-filled pipe elongated longitudinally of the vehicle and communicating with said bladder whereby forward surging of the liquid in said pipe occurring incident to vehicle deceleration will effect an increase in pressure in the liquid in said bladder to expand it and increase the reaction against said manually operable member.

6. A motor vehicle brake system comprising a brake pedal, master cylinder means having hydraulic lines connected to the wheel cylinders, fluid pressure motor means for operating said master cylinder means, a source of fluid pressure, a valve mechanism connected to said pedal and operative for supplying fluid pressure from said source to said motor means to displace fluid to said brake cylinders, means responsive to the rate of vehicle deceleration for reacting against said brake pedal to oppose operation thereof, means responsive to a failure in pressure in said source for operating said master cylinder means to supply hydraulic fluid to one set of wheel cylinders, and a device operative by said brake pedal for cutting off the supply of hydraulic fluid through one of said lines to the remaining wheel cylinders and for displacing fluid by brake pedal pressure to said remaining wheel cylinders, said device comprising a plunger having a surface subject to pressure generated by said brake pedal for reacting thereagainst in accordance with the pressure displaced by said device to said remaining wheel cylinders.

7. A motor vehicle brake system comprising a brake pedal, master cylinder means having hydraulic lines connected to the wheel cylinders, fluid pressure motor means for operating said master clyinder means, a source of fluid pressure, a valve mechanism connected to said pedal and operative for supplying fluid pressure from said source to said motor means to displace fluid to said brake cylinders, said valve mechanism having a part subject to pressure supplied to said motor means by said valve mechanism for reacting against said brake pedal, means responsive to a failure in pressure in said source for operating said master cylinder means to supply hydraulic fluid to one set of wheel cylinders, and a device operative by said brake pedal for cutting off the supply of hydraulic fluid through one of said lines to the remaining wheel cylinders and for displacing fluid by brake pedal pressure to said remaining wheel cylinders, said device comprising a plunger having a surface subject to pressure generated by said brake pedal for reacting thereagainst in accordance with the pressure displaced by said device to said remaining wheel cylinders.

8. A motor vehicle brake system comprising a brake pedal, master cylinder means having hydraulic lines connected to the wheel cylinders, fluid pressure motor means for operating said master cylinder means, a source of fluid pressure, a valve mechanism connected to said pedal and operative for supplying fluid pressure from said source to said motor means to displace fluid to said brake cylinders, means responsive to the rate of vehicle deceleration for reacting against said brake pedal to oppose operation thereof, said valve mechanism having a part subject to pressure supplied to said motor means by said valve mechanism for reacting against said brake pedal, means responsive to a failure in pressure in said source for operating said master cylinder means to supply hydraulic fluid to one set of wheel cylinders, and a device operative by said brake pedal for cutting off the supply of hydraulic fluid through one of said lines to the remaining wheel cylinders and for displacing fluid by brake pedal pressure to said remaining wheel cylinders, said device comprising a plunger having a surface subject to pressure generated by said brake pedal for reacting thereagainst in accordance with the pressure displaced by said device to said remaining wheel cylinders.

9. A system according to claim 8 wherein the fluid line to said remaining wheel cylinders includes a pressure cylinder, said device comprising a plunger in said pressure cylinder having a valve seat and a valve element operable by said brake pedal for engaging said seat and transmitting movement to said plunger to generate pressure in said pressure cylinder.

10. A motor vehicle brake system comprising a brake pedal, a master cylinder having hydraulic lines connected to the wheel cylinders, a fluid pressure motor having a pressure responsive member connected to said master cylinder, a source of fluid pressure, a valve mechanism connected to said pedal and operative for supplying fluid pressure from said source to said motor, a cylinder in axial alinement with said motor and having a piston therein provided with a portion engageable with said pressure responsive member, a spring in said cylinder biasing said piston into engagement with said pressure responsive member to operate the latter, said cylinder having a pressure chamber communicating with said source to hold said piston retracted to an inoperative position against said spring, said brake pedal having a normal travel beyond which it is movable upon a failure of pressure in said source, and a device operative by said brake pedal beyond its normal travel for cutting off the supply of hydraulic fluid from one of said lines to the remaining wheel cylinders and for displacing fluid by brake pedal pressure to said remaining wheel cylinders.

11. A system according to claim 10 wherein said device comprises a pressure generating plunger having a surface subject to pressure generated by said brake pedal for reacting thereagainst in accordance with the pressure displaced by said device to said remaining wheel cylinders.

12. A motor vehicle brake system comprising a brake pedal, a master cylinder having hydraulic lines connected to the wheel cylinders, a fluid pressure motor having a pressure responsive member connected to said master cylinder, a source of fluid pressure, a valve mechanism connected to said pedal and operative for supplying fluid pressure from said source to said motor, means responsive to a predetermined rate of vehicle deceleration for reacting against said brake pedal to oppose operation thereof, a cylinder in axial alinement with said motor and having a piston therein provided with a portion engageable with said pressure responsive member, a spring in said cylinder biasing said piston into engagement with said pressure responsive member to operate the latter, said cylinder having a pressure chamber communicating with said source to hold said piston retracted to an inoperative position against said spring, said brake pedal having a normal travel beyond which it is movable upon a failure of pressure in said source, and a device operative by said brake pedal beyond its normal travel for cutting off the supply of hydraulic fluid from one of said lines to the remaining wheel cylinders and for displacing fluid by brake pedal pressure to said remaining wheel cylinders.

13. A motor vehicle brake system comprising a brake pedal, a master cylinder having hydraulic lines connected to the wheel cylinders, a fluid pressure motor having a pressure responsive member connected to said master cylinder, a source of fluid pressure, a valve mechanism connected to said pedal and operative for supplying fluid pressure from said source to said motor, means responsive to the pressure supplied to said motor by said valve mechanism for reacting against said brake pedal to oppose operation thereof, a cylinder in axial alinement with said motor and having a piston therein provided with a portion engageable with said pressure responsive member, a spring in said cylinder biasing said piston into engagement with said pressure responsive member to operate the latter, said cylinder having a pressure chamber communicating with said source to hold said piston retracted to an inoperative position against said spring, said brake pedal having a normal travel beyond which it is movable upon a failure of pressure in said source, and a device operative by said brake pedal beyond its normal travel for cutting off the supply of hydraulic fluid from one of said lines to the remaining wheel cylinders and for displacing fluid by brake pedal pressure to said remaining wheel cylinders.

14. A system according to claim 13 provided with means responsive to vehicle deceleration for reacting against said brake pedal to oppose operation thereof.

References Cited in the file of this patent

UNITED STATES PATENTS

| | | |
|---|---|---|
| 2,110,692 | Aikman | Mar. 8, 1938 |
| 2,788,012 | Torre | Apr. 9, 1957 |
| 2,959,450 | Gladden et al. | Nov. 8, 1960 |
| 2,963,328 | Lucien | Dec. 6, 1960 |
| 2,976,085 | Grogan | Mar. 21, 1961 |
| 3,005,664 | Hooven | Oct. 24, 1961 |
| 3,017,922 | Peterson | Jan. 23, 1962 |